United States Patent
Li et al.

(10) Patent No.: US 11,665,620 B2
(45) Date of Patent: May 30, 2023

(54) DATA TRANSMISSION CONTROL METHOD AND APPARATUS

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 159 days.

(21) Appl. No.: 17/259,920

(22) PCT Filed: Jul. 13, 2018

(86) PCT No.: PCT/CN2018/095594
§ 371 (c)(1),
(2) Date: Jan. 12, 2021

(87) PCT Pub. No.: WO2020/010607
PCT Pub. Date: Jan. 16, 2020

(65) Prior Publication Data
US 2021/0297930 A1    Sep. 23, 2021

(51) Int. Cl.
*H04W 48/02* (2009.01)
*H04W 48/08* (2009.01)

(52) U.S. Cl.
CPC .......... *H04W 48/02* (2013.01); *H04W 48/08* (2013.01)

(58) Field of Classification Search
CPC .............................. H04W 48/02; H04W 48/08
USPC ......................................................... 455/434
See application file for complete search history.

(56) References Cited

U.S. PATENT DOCUMENTS

| 10,172,181 | B2 | 1/2019 | Kim et al. |
| 10,764,815 | B2* | 9/2020 | Park ................. H04W 72/0413 |
| 2015/0215843 | A1 | 7/2015 | Lee et al. |
| 2015/0334769 | A1 | 11/2015 | Kim et al. |
| 2018/0020382 | A1* | 1/2018 | Kim ........................ H04L 1/189 |
| 2018/0199263 | A1 | 7/2018 | Huang-Fu et al. |

FOREIGN PATENT DOCUMENTS

| CN | 104754690 A | 7/2015 |
| CN | 105637920 A | 6/2016 |
| CN | 105828379 A | 8/2016 |
| CN | 106068633 A | 11/2016 |
| CN | 106550424 A | 3/2017 |
| CN | 106941477 A | 7/2017 |
| CN | 107426823 A | 12/2017 |

(Continued)

OTHER PUBLICATIONS

International Search Report in the international application No. PCT/CN2018/095594, dated Mar. 21, 2019.

(Continued)

*Primary Examiner* — Ted M Wang
(74) *Attorney, Agent, or Firm* — Syncoda LLC; Feng Ma

(57) ABSTRACT

A method for controlling data transmission includes: when new data needs to be transmitted on an existing session, performing an access level prohibition detection on for each cell group in a plurality of cell groups associated with a Packet Data Convergence Protocol (PDCP) entity; and when a result of the access level prohibition detection exists as a blocked cell group, shielding the transmission of the new data to the cell group.

20 Claims, 11 Drawing Sheets

```
┌─ 101
When new data needs to be transmitted over an existing
session, perform ACB detection on each of multiple cell
groups associated with a PDCP entity
```

```
┌─ 102
In response to an ACB detection result indicating that a
cell group is barred, shield transmission of the new data to
the cell group
```

(56) References Cited

FOREIGN PATENT DOCUMENTS

| CN | 108024286 A | 5/2018 |
|---|---|---|
| WO | 2014010919 A1 | 1/2014 |
| WO | 2015174790 A1 | 11/2015 |
| WO | 2018084520 A1 | 5/2018 |
| WO | 2018127162 A1 | 7/2018 |

OTHER PUBLICATIONS

English translation of the Written Opinion of the International Search Authority in the international application No. PCT/CN2018/095594, dated Mar. 21, 2019.
3GPP TSG-RAN WG2 #102 R2-1808597, Busan, Republic of Korea, May 21-25, 2018; Agenda item: 10.4.1 8.1 Source: LG Electronics Inc. (Email discussion Rapporteur); Title: [101bis#45][NR] TP on AC (LG).
3GPP TSG-RAN2 Meeting #99 R2-1707785 (update of R2-1705743), Berlin, Germany, Aug. 21-25, 2017; Agenda item: 9.7.2; Source: Qualcomm Incorporated; Title: Considerations on LTE connectivity to 5G-CN.
First Office Action of the Chinese application No. 201880001156.8, dated Jun. 19, 2020.
Office Action of the Indian application No. 202147005321, dated Jan. 11, 2022.
Spreadtrum Communications:"Barring information signalling for 5G unified access control", 3GPP Draft; R2-1809557, 3rd Generation Partnership Project (3GPP), Mobile Competence Centre ; 650, Route Des Lucioles ; F-06921 Sophia-Antipolis Cedex ; France vol. RAN WG2, no. Montreal, Canada; Jul. 2, 2018-Jul. 6, 2018 Jul. 1, 2018 (Jul. 1, 2018), XP051466833, Retrieved from the Internet: URL:http://www.3gpp.org/ftp/Meetings%5FSYNC/RAN2/Docs[retrieved on Jul. 1, 2018].
CATT:"Further Optimization on Access Control Barring Information" 3GPP Draft; R2-1809539 Further Optimization on Access Control Barring Information 3rd Generation Partnership Project (3GPP), Mobile Competence Centre ; 650, Route Des Lucioles ;F-06921 Sophia-Antipo vol. RAN WG2, no. Montreal, Canada; Jul. 2, 2018-Jul. 1, 2018 Jul. 1, 2018 (Jul. 1, 2018), XP051466815, Retrieved from the Internet: URL:http://www.3gpp.org/ftp/Meetings%5F3GPP%5FSYNC/RAN2/Docs[retrieved on Jul. 1, 2018].
Supplementary European Search Report in European application No. 18926166.2, dated Feb. 3, 2022.

\* cited by examiner

DATA TRANSMISSION CONTROL METHOD AND APPARATUS

CROSS-REFERENCE TO RELATED APPLICATIONS

This application is a U.S. national stage of International Application No. PCT/CN2018/095594 filed on Jul. 13, 2018, the disclosure of which is hereby incorporated by reference in its entirety.

TECHNICAL FIELD

The present disclosure relates to the technical field of communications, and in particular, to a method and device for controlling data transmission.

BACKGROUND

In related art, for the New Radio (NR) system, when the user equipment needs to upload new data through an existing Protocol Data Unit (PDU) session, the decision is made by using a threshold according to the provisions of the Packet Data Convergence Protocol (PDCP). If the amount of data to be uploaded is less than a preset threshold, the data to be uploaded is only sent to the Media Access Control (MAC) layer corresponding to the Master Cell Group (MCG). If the amount of data to be uploaded is not less than the preset threshold, the data to be uploaded is sent to the MAC layers corresponding to MCG and Secondary Cell Group (SCG). Whether there is an improving scheme for the control process of data uploading is a problem worthy to be considered.

SUMMARY

Embodiments of the disclosure provide a method and device for controlling data transmission. The technical solution is as follows.

According to a first aspect of the embodiments of the present disclosure, there is provided a method for controlling data transmission, which includes the following operations.

When new data needs to be transmitted over an existing session, Access Class Barring (ACB) detection is performed on each of multiple cell groups associated with a PDCP entity.

In response to an ACB detection result indicating that a cell group is barred, transmission of the new data to the cell group is shielded.

The technical solutions provided in the embodiments of the present disclosure may have the following beneficial effects. In the embodiment, when new data needs to be transmitted, an ACB detection mechanism is added to provide an implementation mode of shielding transmission of new data to the cell group, so as to improve the mechanism of controlling the uplink data transmission. In this way, when a cell group is barred, transmission of new data to the cell group is shielded, which can mitigate the barring situation.

In an embodiment, the operation that ACB detection is performed on each of the multiple cell groups associated with the PDCP entity may include that:

ACB detection is performed on each of the multiple cell groups associated with the PDCP entity by a Radio Resource Control (RRC) layer; and the ACB detection result is sent to a PDCP layer by the RRC layer;

or, access control barring parameters required for ACB detection are sent to the PDCP layer by the RRC layer; and ACB detection is performed on each of the multiple cell groups associated with the PDCP entity by the PDCP layer according to the received access control barring parameters.

The technical solutions provided in the embodiments of the present disclosure may have the following beneficial effects. The embodiment can be implemented by multiple user planes in user equipment; the embodiment provides multiple implementation modes and is suitable for multiple application scenarios.

In an embodiment, the method may further include that: dedicated signaling is received from a network side, the dedicated signaling including access control barring parameters.

The operation that ACB detection is performed on each of the multiple cell groups associated with the PDCP entity may include that:

ACB detection is performed on each of the multiple cell groups associated with the PDCP entity according to the access control barring parameters.

The technical solutions provided in the embodiments of the present disclosure may have the following beneficial effects. In the embodiment, the user equipment may receive access control barring parameters sent by the network side in advance through dedicated signaling so as to perform ACB detection. The embodiment provides a way to obtain access control barring parameters.

In an embodiment, the access control barring parameters may include logical channel parameters or Data Radio Bearer (DRB) barring parameters corresponding to each cell group.

The operation that ACB detection is performed on each of the multiple cell groups associated with the PDCP entity may include that:

ACB detection is performed on logical channels corresponding to each cell group according to the logical channel parameters corresponding to the cell group; or ACB detection is performed on DRBs corresponding to each cell group according to the DRB barring parameters corresponding to the cell group.

The technical solutions provided in the embodiments of the present disclosure may have the following beneficial effects. The embodiment provides ACB detection of multiple granularities, which may be logical channel category or data radio bearer category, so that the detection is performed more finely and uplink data transmission is controlled more accurately.

In an embodiment, the multiple cell groups may include a Master Cell Group (MCG) and a Secondary Cell Group (SCG).

The operation that when the new data needs to be transmitted over the existing session, ACB detection is performed on each of the multiple cell groups associated with the PDCP entity may include that:

ACB detection is performed on the MCG through a split bear when the new data needs to be transmitted on the existing session; and an ACB detection result of the MCG is applied to the SCG.

The technical solutions provided in the embodiments of the present disclosure may have the following beneficial effects. According to the embodiment, when there is new data to be transmitted on the existing session through a split bear, ACB detection may be performed on MCG, and an ACB detection result of the MCG is applied to the SCG. In this way, the detection process can be simplified.

In an embodiment, the access control barring parameters may not include the access control barring parameters corresponding to the SCG.

The technical solutions provided in the embodiments of the present disclosure may have the following beneficial effects. The received access control barring parameters include the access control barring parameters corresponding to the MCG, and do not include the access control barring parameters corresponding to the SCG, which can reduce the amount of data transmission of the network and save network resources.

In an embodiment, the operation that transmission of the new data to the cell group is shielded may include that:

transmission of the new data to the cell group that is barred as indicated by the ACB detection result, is canceled by the PDCP layer.

The technical solutions provided in the embodiments of the present disclosure may have the following beneficial effects. According to the embodiment, there are multiple manners for shielding the transmission of new data to the cell group, one being that the transmission of the new data to a cell group whose ACB detection result indicates that the cell group is barred, is canceled by the PDCP layer, which provides an implementation mode of shielding.

In an embodiment, the operation that the transmission of the new data to the cell group is shielded may include that:

an amount of uplink data to be transmitted being zero is notified by the PDCP layer to an MAC layer corresponding to the cell group that is barred as indicated by the ACB detection result.

The technical solutions provided in the embodiments of the present disclosure may have the following beneficial effects. In the embodiment, it is notified by the PDCP layer that an amount of uplink data to be transmitted is zero to an MAC layer corresponding to the cell group whose ACB detection result indicates that the cell group is barred, which provides another shielding manner.

In an embodiment, the method may further include the following operations.

An ACB timer corresponding to the cell group that is barred as indicated by the ACB detection result, is started.

ACB detection is performed again on the cell group that is barred as indicated by the ACB detection result.

The technical solutions provided in the embodiments of the present disclosure may have the following beneficial effects. In the embodiment, the resources consumed by frequent detection can be reduced by using the ACB timers.

In an embodiment, the method may further include the following operation.

In response to the ACB detection result indicating that a cell group is not barred, transmitting, on the cell group that is not barred as indicated by the ACB detection result, the new data corresponding to the cell group that is barred as indicated by the ACB detection result.

The technical solutions provided in the embodiments of the present disclosure may have the following beneficial effects. In the embodiment, the new data corresponding to a cell group whose ACB detection result indicates that the cell group is barred is transmitted on a cell group whose ACB detection result indicates that the cell group is not barred, which not only mitigates the barred cell group, but also realizes uploading of data.

In an embodiment, the method may further include the following operations.

In response to the ACB detection result indicating that a cell group is not barred, the new data is transmitted on the cell group.

An activity timer is started.

The ACB detection is shielded before the activity timer has expired and when the new data needs to be transmitted again over the existing session.

The technical solutions provided in the embodiments of the present disclosure may have the following beneficial effects. In the embodiment, the resources consumed by frequent detection can be reduced by using the activity timer.

According to a second aspect of the embodiments of the present disclosure, there is provided a device for controlling data transmission, the device including a first detection module and a first shielding module.

The first detection module is configured to, when new data needs to be transmitted over an existing session, perform ACB detection on each of multiple cell groups associated with a PDCP entity.

The first shielding module is configured to shield transmission of the new data to the cell group in response to an ACB detection result indicating that a cell group is barred.

In an embodiment, the first detection module may include: an RRC detection sub-module and a first RRC sending sub-module; or include a second RRC sending sub-module and a PDCP detection sub-module.

The RRC detection sub-module may be configured to perform ACB detection on each of the multiple cell groups associated with the PDCP entity by an RRC layer.

The first RRC sending sub-module may be configured to send the ACB detection result to a PDCP layer by the RRC layer.

The second RRC sending sub-module may be configured to send access control barring parameters required for ACB detection to the PDCP layer by the RRC layer.

The PDCP detection sub-module may be configured to perform ACB detection on each of the multiple cell groups associated with the PDCP entity by the PDCP layer according to the access control barring parameters.

In an embodiment, the device may further include: a receiving module, configured to receive dedicated signaling from a network side, where the dedicated signaling includes access control barring parameters.

The first detection module may include: a general detection sub-module, configured to perform ACB detection on each of the multiple cell groups associated with the PDCP entity according to the access control barring parameters.

In an embodiment, the access control barring parameters may include logical channel parameters or DRB barring parameters corresponding to each cell group.

The first detection module may include a channel detection sub-module and a bearer detection sub-module.

The channel detection sub-module may be configured to perform, according to the logical channel parameters corresponding to each cell group, ACB detection on logical channels corresponding to the cell group.

The bearer detection sub-module may be configured to perform, according to the DRB barring parameters corresponding to each cell group, ACB detection on DRBs corresponding to the cell group.

In an embodiment, the multiple cell groups may include an MCG and an SCG.

The first detection module may include: an MCG detection sub-module and an SCG detection sub-module.

The MCG detection sub-module may be configured to perform ACB detection on the MCG through a split bear when the new data needs to be transmitted on the existing session.

The SCG detection sub-module may be configured to apply an ACB detection result of the MCG to the SCG.

In an embodiment, the access control barred parameters may not include the access control barring parameters corresponding to the SCG.

In an embodiment, the first shielding module may include: a PDCP shielding sub-module.

The PDCP shielding sub-module may be configured to cancel, by the PDCP layer, transmission of the new data to the cell group that is barred as indicated by the ACB detection result.

In an embodiment, the first shielding module may include:

a PDCP sending sub-module, configured to notify, by the PDCP layer, that an amount of uplink data to be transmitted is zero, to an MAC layer corresponding to the cell group that is barred as indicated by the ACB detection result.

In an embodiment, the device may further include:

a first starting module, configured to start an ACB timer corresponding to the cell group that is barred as indicated by the ACB detection result.

a second detection module, configured to perform, when the ACB timer has expired, ACB detection again on the cell group that is barred as indicated by the ACB detection result.

In an embodiment, the device may further include:

a first upload module, configured to, in response to the ACB detection result indicating that a cell group is not barred, transmit, on the cell group that is not barred as indicated by the ACB detection result, the new data corresponding to the cell group that the is barred as indicated by the ACB detection result.

In an embodiment, the device may further include:

a second upload module, configured to, in response to the ACB detection result indicating that a cell group is not barred, transmit the new data on the cell group;

a second starting module, configured to start an activity timer; and a second shielding module, configured to shield the ACB detection before the activity timer has expired and when the new data needs to be transmitted again over the existing session.

According to a third aspect of the embodiments of the present disclosure, there is provided a device for controlling data transmission, the device including: a processor; and a memory for storing instructions executable by the processor.

The processor is configured to:

when new data needs to be transmitted over an existing session, perform ACB detection on each of multiple cell groups associated with a PDCP entity; and in response to an ACB detection result indicating that a cell group is barred, shielding transmission of the new data to the cell group.

According to a fourth aspect of the embodiments of the present disclosure, there is provided a computer-readable storage medium, having stored computer instructions thereon, wherein the computer instructions, when being executed a processor, cause the processor to implement the method for controlling data transmission as described above.

It should be understood that the above general description and the detailed description below are only exemplary and explanatory, and not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In related art, for the New Radio (NR) system, when the user equipment needs to upload new data through an existing Protocol Data Unit (PDU) session, the decision is made through the threshold value according to the Packet Data Convergence Protocol (PDCP). If the amount of data to be uploaded is less than a preset threshold value, the data to be uploaded is only sent to the Media Access Control (MAC) layer corresponding to the Master Cell Group (MCG). If the amount of data to be uploaded is not less than the preset threshold value, the data to be uploaded is sent to MAC layers respectively corresponding to MCG and Secondary Cell Group (SCG).

The inventor of the disclosure has found that when new data needs to be transmitted over an existing session, the data will be uploaded regardless of whether its amount is less than a threshold, but in different paths. There is no mechanism for shielding upload is provided in related art. The control mechanism for controlling data upload is incomplete. In this case, embodiments of the disclosure introduce the Access Class Barring (ACB) detection, and when an ACB detection result indicates that a cell group is barred, transmission of new data to the cell group is shielded (i.e., stopped), which improves the mechanism of controlling data upload.

Figure 1:
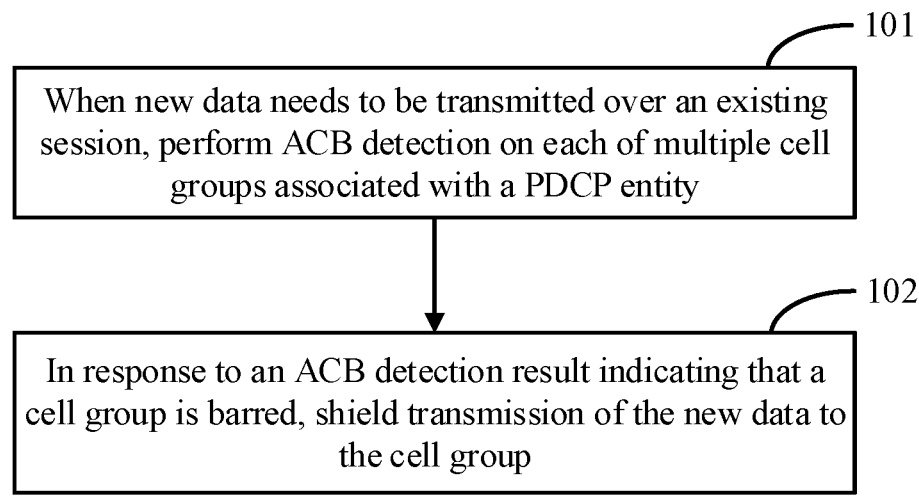
FIG. 1 is a flowchart showing a method for controlling data transmission according to an exemplary embodiment.

FIG. 1 is a flowchart showing a method for controlling data transmission according to an exemplary embodiment. The method for controlling data transmission is applied to user equipment, which may be a mobile phone, a computer, a digital broadcast terminal, a messaging device, a game console, a tablet device, a medical device, a fitness device, a personal digital assistant, etc. As shown in FIG. 1, the method includes the following operations S101-S102.

In S101, when new data needs to be transmitted over an existing session, ACB detection is performed on each of multiple cell groups that are associated with a PDCP entity.

In S102, in response to an ACB detection result indicating that a cell group is barred, transmission of the new data to the cell group is shielded.

In response to the ACB detection result indicating that a cell group is not barred, the new data is transmitted to the cell group.

In the embodiment, UE is in a connected state. When UE needs to upload data via logical channel parameters or data radio bearer on an existing PDU session, new data can be uploaded via the existing PDU session if a PDU session already exists and has not expired and associated Radio Link Control (RLC) entities are located in multiple cell groups. However, ACB detection is required before uploading new data via the PDU session.

In the embodiment, the ACB detection may be performed for each associated cell group respectively. In response to the ACB detection result indicating that a cell group is barred, transmission of the new data to the cell group is shielded.

The associated multiple cell groups include MCG and SCG.

In the embodiment, ACB detection may be implemented by multiple user planes in UE and reference is made to the embodiment below.

In an embodiment, the operation S101 includes step A1 and step A2, or includes step A3 and step A4.

In step A1, ACB detection is performed on each of the multiple cell groups associated with the PDCP entity by a Radio Resource Control (RRC) layer.

In step A2, the ACB detection result is sent to a PDCP layer by the RRC layer.

In the embodiment, the ACB detection is performed by the RRC layer and the ACB detection result is sent to the PDCP layer by the RRC layer.

In step A3, access control barring parameters required for ACB detection is sent to the PDCP layer by the RRC layer.

In step A4, ACB detection is performed on each of the multiple cell groups associated with the PDCP entity by the PDCP layer according to the access control barring parameters.

In the embodiment, the ACB detection is performed by the PDCP layer and the access control barring parameters required by the detection is sent to the PDCP layer in advance by the RRC layer.

In an embodiment, the method further includes step B1.

In step B1, dedicated signaling is received from a network side. The dedicated signaling includes access control barring parameters.

The operation S101 includes step B2.

In step B2, ACB detection is performed on each of the multiple cell groups associated with the PDCP entity according to the access control barring parameters.

In the embodiment, UE receives in advance from the network side (such as base station) dedicated signaling, such as RRC signaling or MAC Control Element (MAC CE) signaling, etc. The dedicated signaling includes access control barring parameters. The access control barring parameters are used for ACB detection.

The access control barring parameters include: access identities, access category, barring factor, barring duration. The access identities are used to mark users, and the access category is used to mark services. The barring factor is used for ACB detection. The barring duration is used for ACB timer.

The services of each user may correspond to respective barring factors. The UE may generate the barring factor randomly, and the network side may send one or more barring factors via the dedicated signaling. If the barring factor randomly generated by the UE is less than the barring factor sent at the network side, then the ACB detection result is not barred, or otherwise, it is barred. As can be seen, the network side may control the uplink data transmission by configuring the barring factors.

The RRC layer in UE receives access control barring parameters firstly. If the ACB detection is performed by the RRC layer, the ACB detection may be performed directly by the RRC. If the ACB detection is performed by the PDCP layer, the access control barring parameters required by the detection are required to be sent to the PDCP layer in advance by the RRC layer.

In an embodiment, the access control barring parameters include logical channel parameters or DRB barring parameters corresponding to each cell group.

The operation S101 includes step C1 or step C2.

In step C1, ACB detection is performed on logical channels corresponding to each cell group according to respective logical channel parameters.

In the embodiment, the ACB detection may be performed on each logical channel of the cell group to realize ACB detection for access class of logical channels. If the ACB detection result indicates that a logical channel is barred, transmission of data on the logical channel is shielded. If the ACB detection result indicates that a logical channel is not barred, data is continued to be transmitted on the logical channel. Correspondingly, the access control barring parameters include parameters of logical channels corresponding to each cell group.

In step C2, ACB detection is performed on DRBs corresponding to each cell group according to respective DRB barring parameters.

In the embodiment, the ACB detection can be performed on each DRB of the cell group to realize ACB detection for access class of DRBs. If the ACB detection result indicates that a DRB is barred, transmission of data on the DRB is shielded. If an ACB detection result indicates that a DRB is not barred, data is continued to be transmitted on the DRB. Correspondingly, the access control barring parameters include barring parameters of DRBs corresponding to each cell group.

The network side can control the granularity of the ACB detection performed by UE through logical channel parameters or DRB barring parameters.

In an embodiment, the multiple cell groups include an MCG and an SCG;

The operation S101 includes step D1 and step D2.

In step D1, ACB detection is performed on the MCG when new data needs to be transmitted on the existing session through a split bear case.

In step D2, an ACB detection result of the MCG is applied to the SCG.

In the embodiment, the split bear case means that different data are transmitted by using the MCG and the SCG.

In the embodiment, the ACB detection may be performed on the MCG when the split bear case is used. The result of ACB detection of the MCG is directly applied on the SCG without performing the ACB detection on the SCG. Under the split bear case, the dedicated signaling may carry or not carry the access control barring parameters of the SCG. In an embodiment, the access control barring parameters do not include the access control barring parameters corresponding to the SCG, which can save the network resources.

When the PDCP duplication case is adopted, i.e., the same data may be transmitted by using the MCG and SCG, ACB detection may be performed respectively on the MCG and the SCG and their ACB detection results are applied respectively. Optionally, the ACB detection may be performed on the MCG, and in this case, the result of ACB detection of the MCG is directly applied on the SCG without performing the ACB detection on the SCG.

In an embodiment, the operation S102 includes step E.

In step E, the PDCP layer cancels transmission of the new data to the cell group that is barred as indicated by the ACB detection result.

In the embodiment, a number of ways may be taken to shield the transmission of new data, one being that the PDCP layer of UE cancels the transmission of new data to a cell group whose ACB detection result is barred. As a result, the transmission of new data on the barred cell group is shielded in the PDCP layer so that the congestion of the cell group is mitigated.

In an embodiment, the operation S102 includes step F.

In step F, an amount of uplink data to be transmitted being zero is notified by the PDCP layer to an MAC layer corresponding to a cell group that is barred as indicated by the ACB detection result.

In the embodiment, the PDCP layer of UE notifies that the amount of uplink data to be transmitted is zero to the MAC layer, which also realizes shielding the transmission of new data. Step F can be combined with step E, or in other words, step F is a specific implementation mode of step E. The PDCP layer determines to shield the transmission of new data according to the ACB detection result. As this time, the PDCP layer may or may not notify the MAC layer. When it is required to notify the MAC layer, the PDCP layer notifies that the amount of uplink data to be transmitted is zero to the MAC layer.

In an embodiment, the method further includes steps G1 and G2.

In step G1, an ACB timer corresponding to the cell group that is barred as indicated by the ACB detection result, is started.

In step G2, when the ACB timer has expired, ACB detection is performed again on the cell group that is barred as indicated by the ACB detection result.

In the embodiment, the ACB timer corresponding to a cell group whose ACB detection result indicates that the cell group is barred, is started. Before the ACB timer has expired, if new data needs to be transmitted, no ACB detection will be performed, and the previous ACB detection result is followed, that is, the ACB detection result indicates a cell group barred and the transmission of new data on the barred cell group is shielded. When the ACB timer has expired, ACB detection is performed again. In this way, frequent ACB detection can be reduced and device power consumption can be saved. The ACB timer can be in millisecond (e.g. 20 ms-100 ms) or in second (e.g. 3-5 seconds).

If the ACB result of the MCG is applied on the SCG, then the SCG may apply the ACB timer of the MCG. One ACB timer may be used for both MCG and SCG at the same time. The MCG and the SCG may also have respective ACB timers.

When the result of ACB detection that is performed again indicates that the cell group is barred, the ACB timer is restarted.

In an embodiment, the method further includes step H.

In the step H, if the ACB detection result indicates that a cell group is not barred, the new data corresponding to a cell group whose ACB detection result indicates that the cell group is barred is transmitted on the cell group that is not barred as indicated by the ACB detection result.

In the embodiment, transmission of the new data corresponding to the cell group, that is barred as indicated by the ACB detection result, may be shielded. In another implementation, if the ACB detection result indicates that a cell group is not barred, the new data corresponding to a cell group whose ACB detection result indicates that the cell group is barred is transmitted on the cell group that is not barred as indicated by the ACB detection result. According to the embodiment, the cell group not barred is utilized to transmit more data, which mitigates data transmission in the cell group barred, and simultaneously ensures the upload of new data timely.

The embodiment is applicable to detection of the MCG and the SCG respectively. The SCG applies the detection result of the SCG instead of applying the detection result of the MCG.

In an embodiment, the method further includes steps I1 to I3.

In step I1, when the ACB detection result indicates that a cell group is not barred, the new data is transmitted on the cell group.

In step I2, an activity timer is started.

In step I3, before the activity timer has expired and when the new data needs to be transmitted again over the existing session, the ACB detection is shielded.

In the embodiment, when the ACB detection result indicates that a cell group is not barred, the new data corresponding to the cell group may be transmitted on the cell group, and new data corresponding to a cell group that is barred as indicated by the ACB detection result may also be transmitted on the cell group that is not barred.

The activity timer corresponding to the cell group not barred is started, before the activity timer has expired and when the new data needs to be transmitted again over the existing session, the ACB detection is shielded and new data is uploaded directly. In this way, frequent ACB detection can be reduced and device power consumption can be saved. When the activity timer has expired and the new data needs to be transmitted again over the existing session, the ACB detection needs to be performed again. The activity timer may be in millisecond (e.g. 20 ms-100 ms) or in second (e.g. 3-5 seconds).

When the activity timer has expired and the new data needs to be transmitted again over the existing session, the ACB detection needs to be shielded again. When the result of ACB detection performed again indicates that the cell group is not barred, the activity timer is restarted.

Or, before the activity timer has expired and when the new data needs to be transmitted again over the existing session, the activity timer is reset.

The embodiment is applicable to detection of the MCG and the SCG respectively. The SCG applies the detection result of the SCG instead of applying the detection result of the MCG.

The implementation process is described in detail below through several embodiments.

Figure 2:
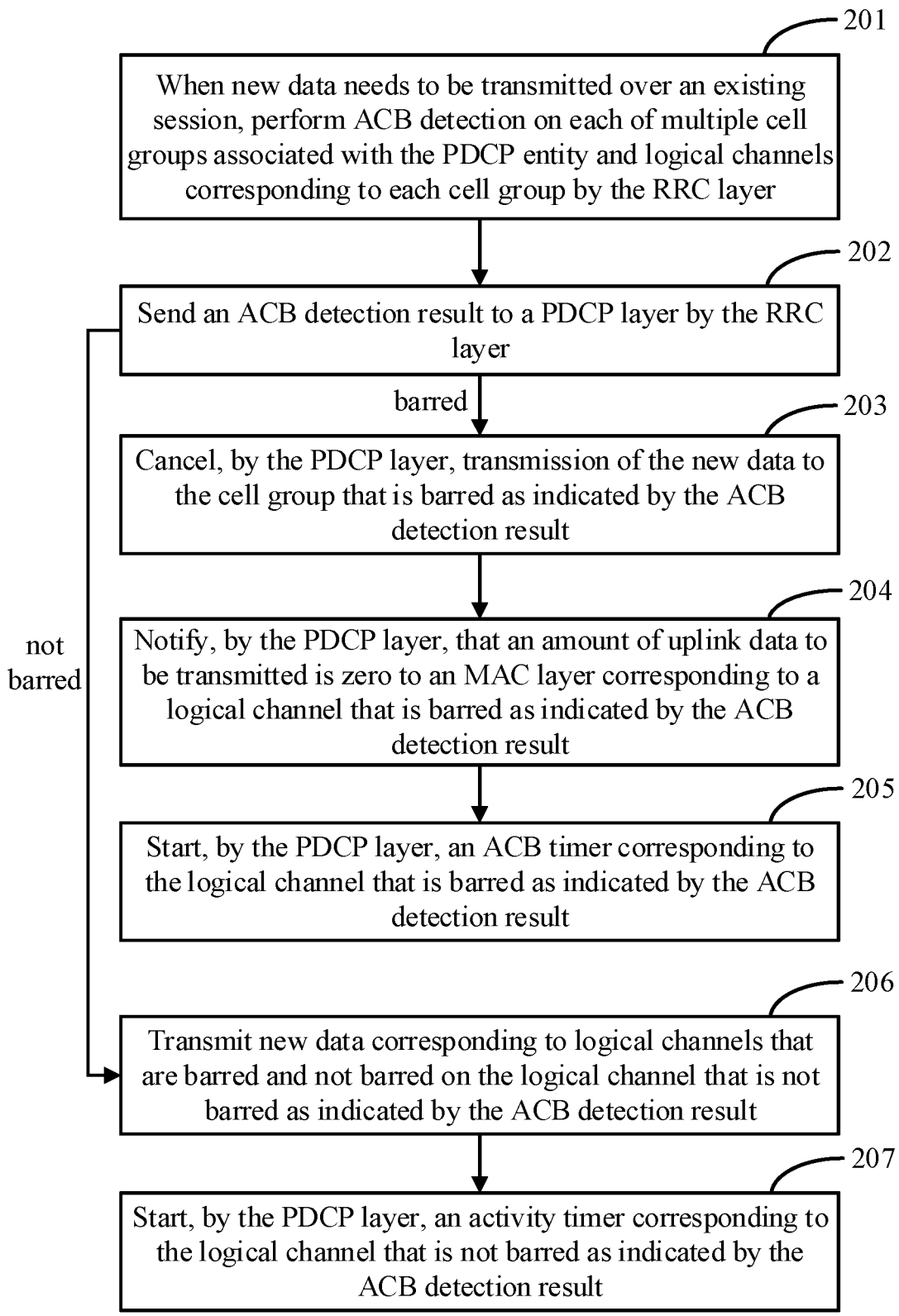
FIG. 2 is a flowchart showing a method for controlling data transmission according to an exemplary embodiment.

FIG. 2 is a flow chart showing a method for controlling data transmission according to an exemplary embodiment. The method for data transmission control is applied to user equipment, which may be a mobile phone, a computer, a digital broadcast terminal, a messaging device, a game console, a tablet device, a medical device, a fitness device, a personal digital assistant, etc. As shown in FIG. 2, the method includes the following operations S201-S207.

In S201, when new data needs to be transmitted over an existing session, ACB detection is performed by the RRC layer on each of multiple cell groups associated with the PDCP entity and logical channels corresponding to each cell group.

In S202, the ACB detection result is sent to a PDCP layer by the RRC layer. When there is a logic channel whose ACB detection result indicates that the logic channel is barred, the operations S203 to S205 are executed. When there is a logic channel whose ACB detection result indicates that the logic channel is not barred, the operations S206 to S207 are executed.

In S203, transmission of the new data to the logical channel that is barred as indicated by the ACB detection result is cancelled by the PDCP layer.

In S204, an amount of uplink data to be transmitted being zero is notified by the PDCP layer to an MAC layer corresponding to the logical channel that is barred as indicated by the ACB detection result.

In S205, an ACB timer corresponding to the logical channel that is barred as indicated by the ACB detection result is started by the PDCP layer.

In S206, new data corresponding to logical channels, barred and not barred as indicated by the ACB detection result, is transmitted on the logical channel that is barred as indicated by the ACB detection result.

In S207, an activity timer corresponding to the logical channel that is not barred as indicated by the ACB detection result is started by the PDCP layer.

The embodiment also applies to the implementation when DRB is the detection granularity.

Figure 3:
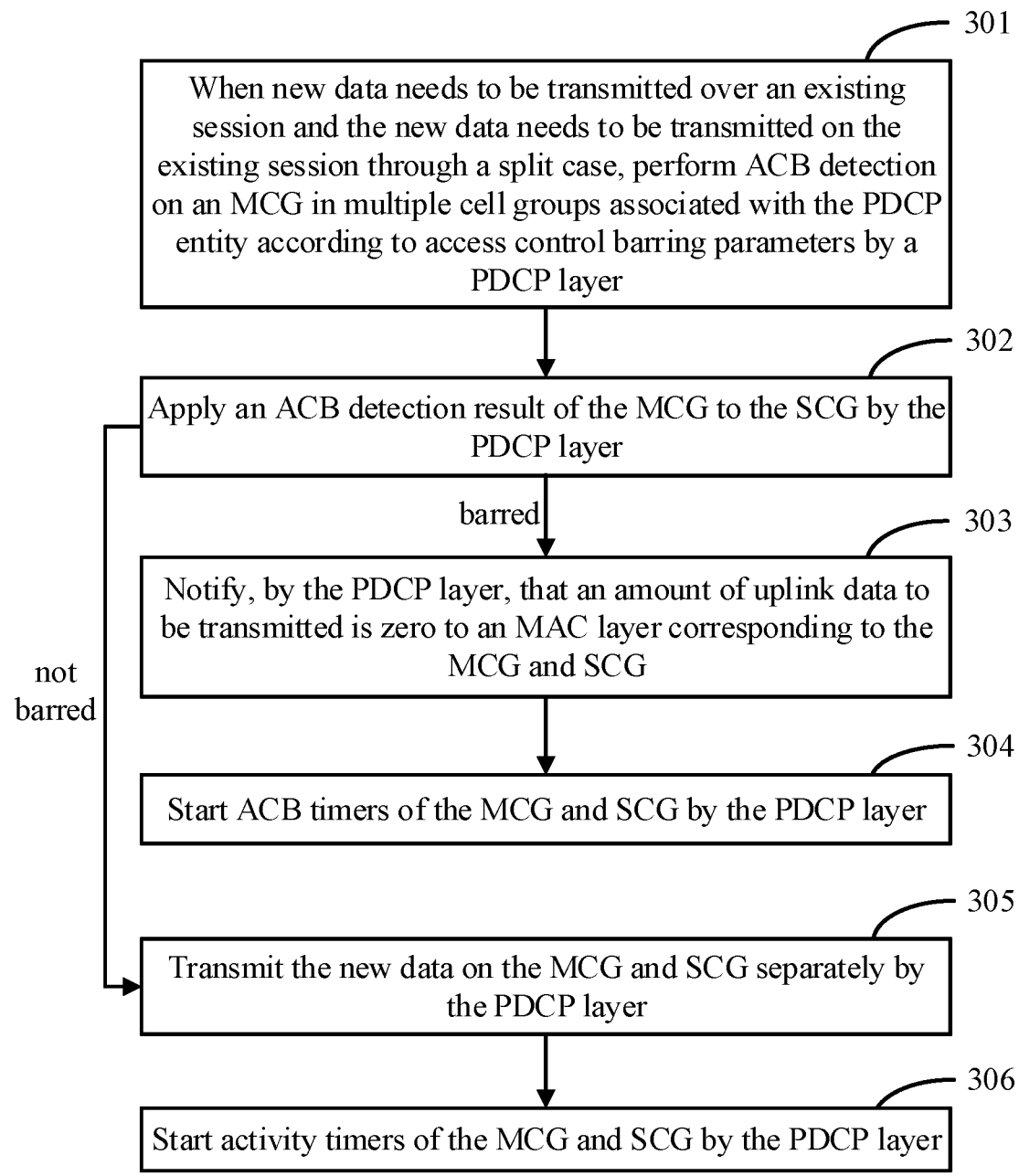
FIG. 3 is a flowchart showing a method for controlling data transmission according to an exemplary embodiment.

FIG. 3 is a flowchart showing a method for controlling data transmission according to an exemplary embodiment; The method for data transmission control is applied to user equipment, which may be a mobile phone, a computer, a digital broadcast terminal, a messaging device, a game console, a tablet device, a medical device, a fitness device, a personal digital assistant, etc. As shown in FIG. 3, the method includes the following operations S301-S306.

In S301, when new data needs to be transmitted over an existing session, and when the new data needs to be transmitted on the existing session through a split bear, ACB detection is performed on an MCG in multiple cell groups associated with the PDCP entity by a PDCP layer according to access control barring parameters.

In S302, an ACB detection result of the MCG is applied to the SCG by the PDCP layer.

When the ACB detection result indicates that the MCG is barred, S303 and S304 are executed. When the ACB detection result indicates that the MCG is not barred, S305 and S306 are executed.

In S303, an amount of uplink data to be transmitted being zero is notified by the PDCP layer to an MAC layer corresponding to the MCG and SCG.

In S304, ACB timers of the MCG and SCG are started by the PDCP layer.

S303 and S304 are separate processes and may be performed synchronously.

In S305, the new data is transmitted on the MCG and SCG separately by the PDCP layer.

In S306, activity timers of the MCG and SCG are started by the PDCP layer.

S305 and S306 are separate processes and may be performed synchronously.

The embodiment may be flexibly combined according to actual requirements.

The following are embodiments the device of the invention, which may be used to implement embodiments of the method of the invention.

Figure 4:
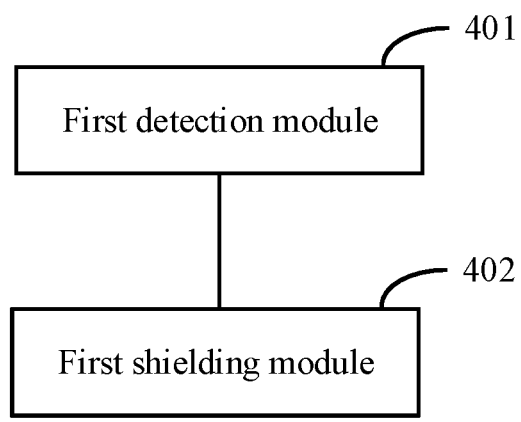
FIG. 4 is a block diagram showing a device for controlling data transmission according to an exemplary embodiment.

FIG. 4 is a block diagram showing a device for controlling data transmission according to an exemplary embodiment. The device may be implemented in software, hardware, or a combination thereof to be part or all of an electronic device. Referring to FIG. 4, the device for controlling data transmission includes: a first detection module 401 and a first shielding module 402.

The first detection module 401 is configured to, when new data needs to be transmitted over an existing session, perform ACB detection on each of multiple cell groups associated with a Packet Data Convergence Protocol (PDCP) entity.

The first shielding module 402 is configured to shield transmission of the new data to the cell group, in response to an ACB detection result indicating that a cell group is barred.

Figure 5:
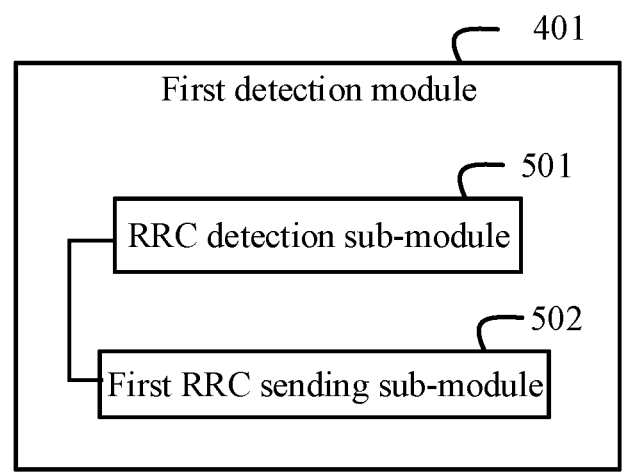
FIG. 5 is a block diagram showing a first detection module according to an exemplary embodiment.
Figure 6:
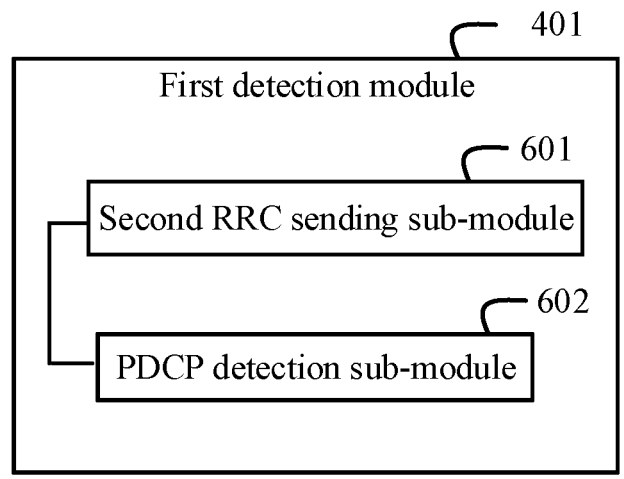
FIG. 6 is a block diagram showing a first detection module according to an exemplary embodiment.

In an embodiment, as shown in FIG. 5 and FIG. 6, the first detection module 401 includes an RRC detection sub-module 501 and a first RRC sending sub-module 502, or includes a second RRC sending sub-module 601 and a PDCP detection sub-module 602.

The RRC detection sub-module 501 is configured to perform ACB detection on each of the multiple cell groups associated with the PDCP entity by an RRC layer.

The first RRC sending sub-module 502 is configured to send the ACB detection result to a PDCP layer by the RRC layer.

The second RRC sending sub-module 601 is configured to send access control barring parameters required for ACB detection to the PDCP layer by the RRC layer.

The PDCP detection sub-module 602 is configured to perform, by the PDCP layer according to the access control barring parameters, ACB detection on each of the multiple cell groups associated with the PDCP entity.

Figure 7:
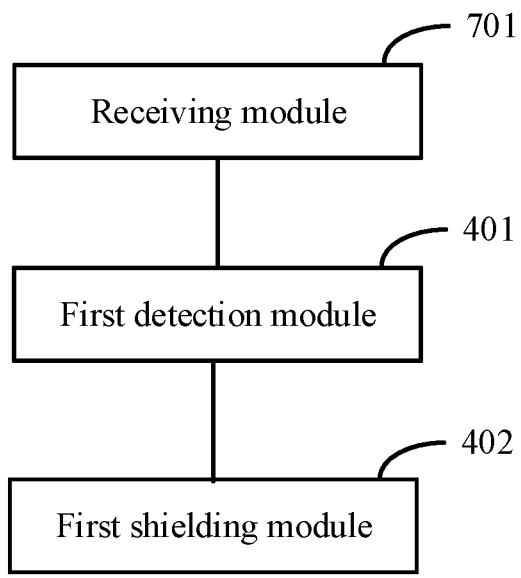
FIG. 7 is a block diagram showing a device for controlling data transmission according to an exemplary embodiment.

In an embodiment, as shown in FIG. 7, the device further includes: a receiving module 701.

The receiving module 701 is configured to receive dedicated signaling from a network side. The dedicated signaling includes access control barring parameters.

Figure 8:
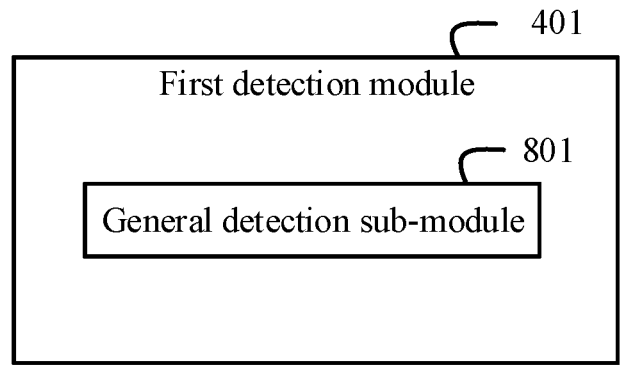
FIG. 8 is a block diagram showing a first detection module according to an exemplary embodiment.

As shown in FIG. 8, the first detection module 401 includes: a general detection sub-module 801.

The general detection sub-module 801 is configured to perform ACB detection on each of the multiple cell groups associated with the PDCP entity according to the access control barring parameters.

In an embodiment, the access control barring parameters include logical channel parameters or DRB barring parameters corresponding to each cell group.

Figure 9:
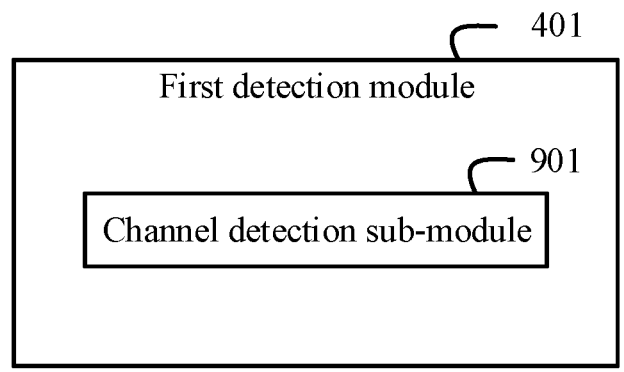
FIG. 9 is a block diagram showing a first detection module according to an exemplary embodiment.
Figure 10:
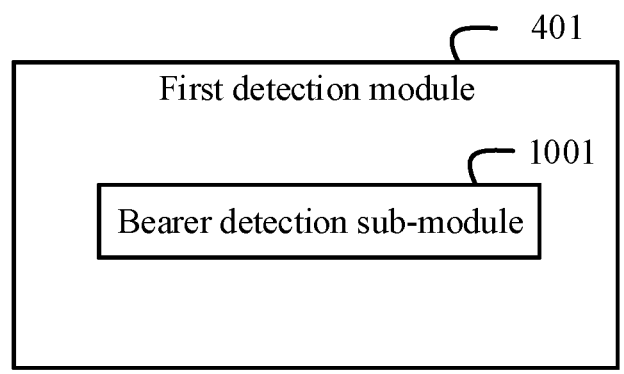
FIG. 10 is a block diagram showing a first detection module according to an exemplary embodiment.

As shown in FIG. 9 and FIG. 10, the first detection module 401 includes: a channel detection sub-module 901 or a bearer detection sub-module 1001.

The channel detection sub-module 901 is configured to perform ACB detection on logical channels corresponding to each cell group according to the logical channel parameters.

The bearer detection sub-module 1001 is configured to perform ACB detection on DRBs corresponding to each cell group according to the DRBs barring parameters.

In an embodiment, the multiple cell groups include MCG and SCG.

Figure 11:
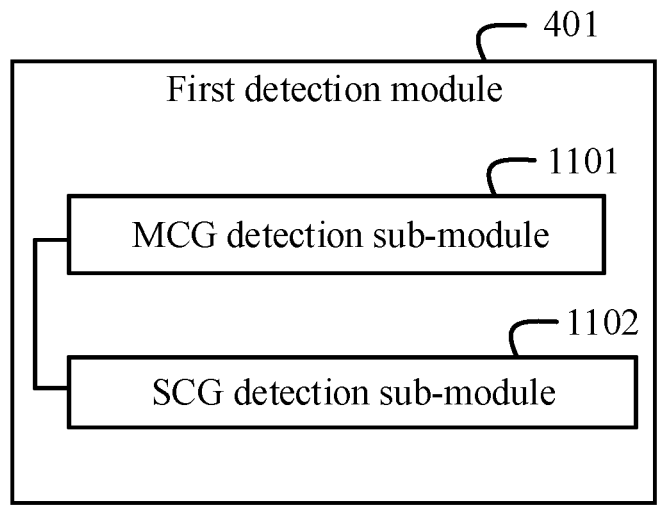
FIG. 11 is a block diagram showing a first detection module according to an exemplary embodiment.

As shown in FIG. 11, the first detection module 401 includes: an MCG detection sub-module 1101 and an SCG detection sub-module 1102.

The MCG detection sub-module 1101 is configured to perform ACB detection on the MCG when the new data needs to be transmitted on the existing session through a split bear.

The SCG detection sub-module 1102 is configured to apply an ACB detection result of the MCG to the SCG.

In an embodiment, the access control barring parameters do not include the access control barring parameters corresponding to the SCG.

Figure 12:
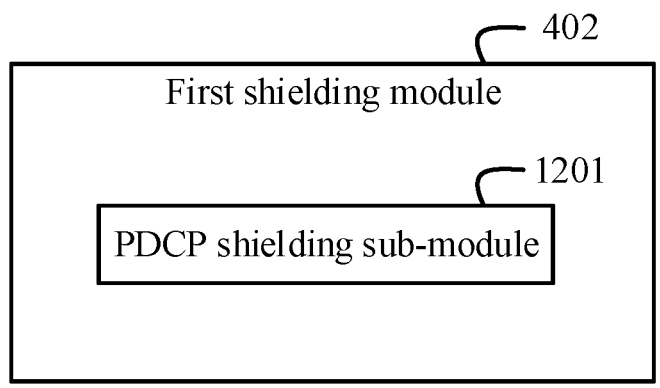
FIG. 12 is a block diagram showing a first shielding module according to an exemplary embodiment.

In an embodiment, as shown in FIG. 12, the first shielding module 402 includes: a PDCP shielding sub-module 1201.

The PDCP shielding sub-module 1201 is configured to cancel, by the PDCP layer, transmission of the new data to the cell group that is barred as indicated by the ACB detection result.

Figure 13:
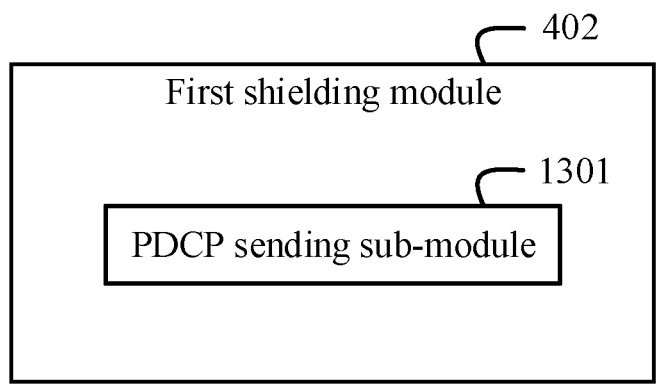
FIG. 13 is a block diagram showing a first shielding module according to an exemplary embodiment.

In an embodiment, as shown in FIG. 13, the first shielding module 402 includes: a PDCP sending sub-module 1301.

The PDCP sending sub-module 1301 is configured to notify, by the PDCP layer, that an amount of uplink data to be transmitted is zero to an MAC layer corresponding to the cell group that is barred as indicated by the ACB detection result.

Figure 14:
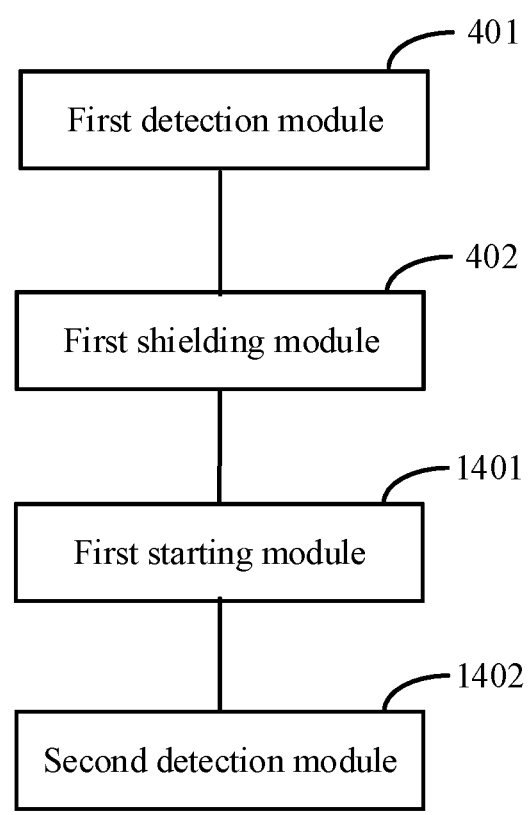
FIG. 14 is a block diagram showing a device for controlling data transmission according to an exemplary embodiment.

In an embodiment, as shown in FIG. 14, the device further includes: a first starting module 1401 and a second detection module 1402.

The first starting module 1401 is configured to start an ACB timer corresponding to the cell group that is barred as indicated by the ACB detection result.

The second detection module 1402 is configured to perform, when the ACB timer has expired, ACB detection again on the cell group that is barred as indicated by the ACB detection result.

Figure 15:
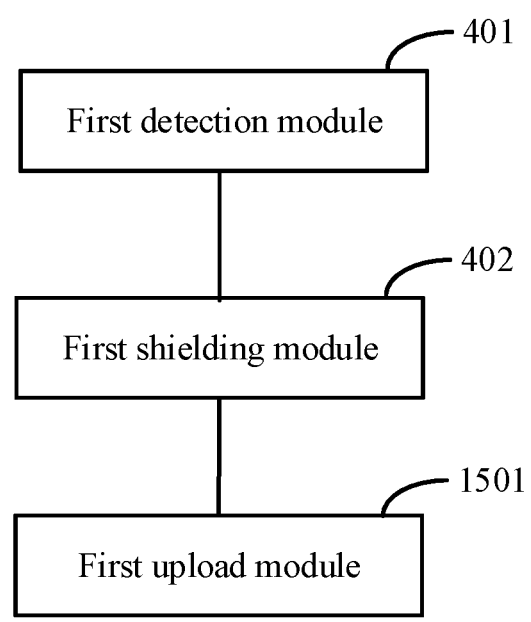
FIG. 15 is a block diagram showing a device for controlling data transmission according to an exemplary embodiment.

In an embodiment, as shown in FIG. 15, the device further includes: a first upload module 1501.

The first upload module 1501 is configured to, in response to the ACB detection result indicating that a cell group is not barred, transmit, on the cell group that the cell group is not barred as indicated by the ACB detection result, the new data corresponding to the cell group that is barred as indicated by the ACB detection result.

Figure 16:
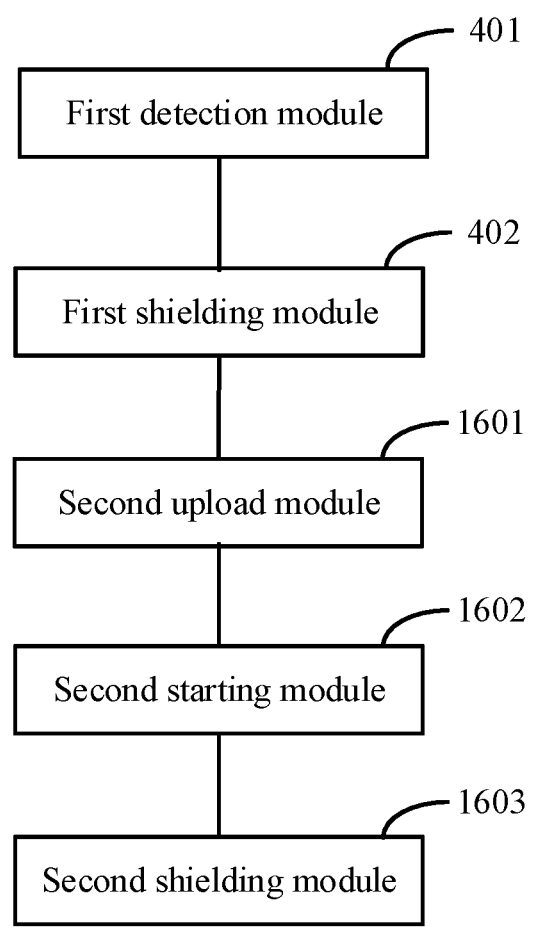
FIG. 16 is a block diagram showing a device for controlling data transmission according to an exemplary embodiment.

In an embodiment, as shown in FIG. 16, the device further includes: a second upload module 1601, a second starting module 1602 and a second shielding module 1603.

The second upload module 1601 is configured to, in response to the ACB detection result indicating that a cell group is not barred, transmit the new data on the cell group.

The second starting module 1602 is configured to start an activity timer.

The second shielding module 1603 is configured to shield the ACB detection before the activity timer has expired and when the new data needs to be transmitted again over the existing session.

With regard to the device in the above embodiments, specific manners of each module performs operations has been described in detail in the embodiments of the method, and will not be explained in detail herein.

Figure 17:
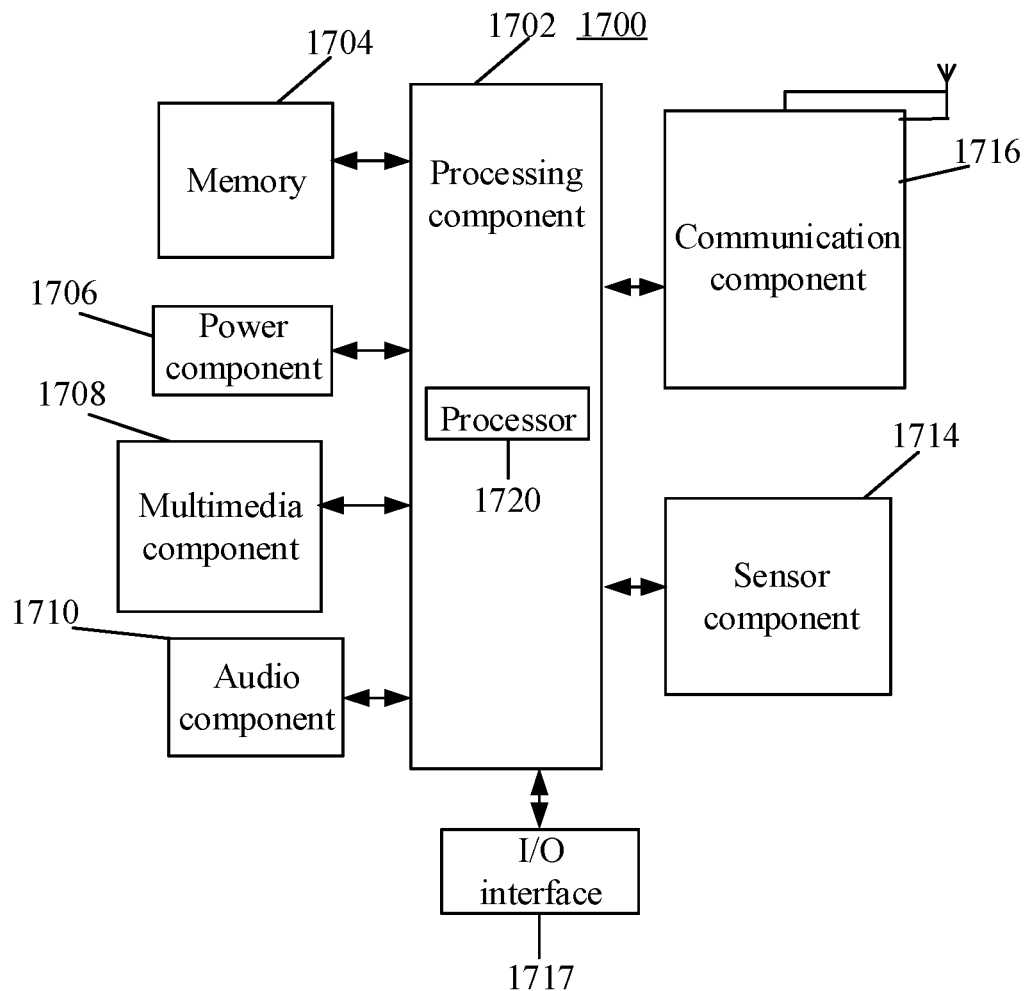
FIG. 17 is a block diagram showing a device for controlling data transmission according to an exemplary embodiment.

FIG. 17 is a block diagram showing a device for controlling data transmission according to an exemplary embodiment. For example, the device 1700 may be UE such as a mobile phone, a computer, a digital broadcast terminal, a messaging device, a gaming console, a tablet, a medical device, exercise equipment and a personal digital assistant.

The device 1700 may include one or more of the following components: a processing component 1702, a memory 1704, a power component 1706, a multimedia component 1708, an audio component 1710, an Input/Output (I/O) interface 1717, a sensor component 1714, or a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the abovementioned method. Moreover, the processing component 1702 may include one or more modules which facilitate interactions between the processing component 1702 and the other components. For instance, the processing component 1702 may include a multimedia module to facilitate interaction between the multimedia component 1708 and the processing component 1702.

The memory 1704 is configured to store various types of data to support the operations of the device 1700. Examples of such data include instructions for any application programs or methods operated on the device 1700, contact data, phonebook data, messages, pictures, video, etc. The memory 1704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1706 provides power for various components of the device 1700. The power component 1706 may include a power management system, one or more power supplies, and other components associated with generation, management and distribution of power for the device 1700.

The multimedia component 1708 includes a screen providing an output interface between the device 1700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1708 includes a front camera and/or a rear camera. The front camera and/or the rear camera may receive external multimedia data when the device 1700 is in an operation mode, such as a photographing mode or a video mode. Each of the front camera and the rear camera may be a fixed optical lens system or have focusing and optical zooming capabilities.

The audio component 1710 is configured to output and/or input an audio signal. For example, the audio component 1710 includes a Microphone (MIC), and the MIC is configured to receive an external audio signal when the device 1700 is in the operation mode, such as a call mode, a recording mode and a voice recognition mode. The received audio signal may further be stored in the memory 1704 or sent through the communication component 1716. In some embodiments, the audio component 1710 further includes a speaker configured to output the audio signal.

The I/O interface 1717 provides an interface between the processing component 1702 and a peripheral interface module, and the peripheral interface module may be a keyboard, a click wheel, a button and the like. The button may include, but not limited to: a home button, a volume button, a starting button and a locking button.

The sensor component 1714 includes one or more sensors configured to provide status assessment in various aspects for the device 1700. For instance, the sensor component 1714 may detect an on/off status of the device 1700 and relative positioning of components, such as a display and small keyboard of the device 1700, and the sensor component 1714 may further detect a change in a position of the device 1700 or a component of the device 1700, presence or absence of contact between the user and the device 1700, orientation or acceleration/deceleration of the device 1700 and a change in temperature of the device 1700. The sensor component 1714 may include a proximity sensor configured to detect presence of an object nearby without any physical contact. The sensor component 1714 may also include a light sensor, such as a Complementary Metal Oxide Semi-conductor (CMOS) or Charge Coupled Device (CCD) image sensor, configured for use in an imaging application. In some embodiments, the sensor component 1714 may also include an acceleration sensor, a gyroscope sensor, a magnetic sensor, a pressure sensor or a temperature sensor.

The communication component 1716 is configured to facilitate wired or wireless communication between the device 1700 and another device. The device 1700 may access a communication-standard-based wireless network, such as a Wireless Fidelity (WiFi) network, a 2nd-Generation (2G) or 3rd-Generation (3G) network or a combination thereof. In an exemplary embodiment, the communication component 1716 receives a broadcast signal or broadcast associated information from an external broadcast management system through a broadcast channel. In an exemplary embodiment, the communication component 1716 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments, the device 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 1704 including instructions, and the instructions may be executed by the processor 1720 of the device 1700 to execute the method, such as the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, there is provided a device for controlling data transmission, the device including:
a processor; and
a memory for storing instructions executable by the processor;
where the processor is configured to:
when new data needs to be transmitted over an existing session, perform ACB detection on each of multiple cell groups associated with a PDCP entity;
in response to an ACB detection result indicating that a cell group is barred, shield transmission of the new data to the cell group.

The operation of performing ACB detection on each of multiple cell groups associated with a PDCP entity includes:
performing ACB detection on each of the multiple cell groups associated with the PDCP entity by an RRC layer; and
sending the ACB detection result to a PDCP layer by the RRC layer;
or,
sending access control barring parameters required for ACB detection to the PDCP layer by the RRC layer; and
performing, according to the access control barring parameters, ACB detection on each of the multiple cell groups associated with the PDCP entity by the PDCP layer.

The processor is further configured to:
receive dedicated signaling from a network side, where the dedicated signaling includes access control barring parameters.

The operation of performing ACB detection on each of multiple cell groups associated with a PDCP entity includes:
performing ACB detection on each of the multiple cell groups associated with the PDCP entity according to the access control barring parameters.

The access control barring parameters include logical channel parameters or DRB barring parameters corresponding to each cell group.

The operation of performing ACB detection on each of multiple cell groups associated with a PDCP entity includes:
performing, according to the logical channel parameters corresponding to each cell group, ACB detection on logical channels corresponding to the cell group; or
performing, according to the DRB barring parameters corresponding to each cell group, ACB detection on DRBs corresponding to the cell group.

The multiple cell groups include an MCG and an SCG.

The operation of when the new data needs to be transmitted over the existing session, performing ACB detection on each of the multiple cell groups associated with the PDCP entity includes:
performing ACB detection on the MCG when the new data needs to be transmitted on the existing session through a split bear; and
applying an ACB detection result of the MCG to the SCG.

The access control barring parameters do not include the access control barring parameters corresponding to the SCG.

The operations of shielding the transmission of the new data to the cell group includes:

canceling, by the PDCP layer, transmission of the new data to the cell group that is barred as indicated by the ACB detection result.

The operation of shielding the transmission of the new data to the cell group includes:

notifying, by the PDCP layer, that an amount of uplink data to be transmitted is zero to an MAC layer corresponding to the cell group that is barred as indicated by the ACB detection result.

The processor is further configured to:

start an ACB timer corresponding to the cell group that is barred as indicated by the ACB detection result; and perform, when the ACB timer has expired, ACB detection again on the cell group that is barred as indicated by the ACB detection result.

The processor is further configured to:

in response to the ACB detection result indicating that a cell group is not barred, transmit, on the cell group that is not barred as indicated by the ACB detection result, the new data corresponding to the cell group that is barred as indicated by the ACB detection result.

The processor is further configured to:

in response to the ACB detection result indicating that a cell group is not barred, transmit the new data on the cell group;

start an activity timer; and shield the ACB detection before the activity timer has expired and when the new data needs to be transmitted again over the existing session.

There is provided a non-transitory computer-readable storage medium having stored therein instructions, and the instructions, when being executed by a processor of a device, cause the device to perform the operations of the method for controlling data transmission, the operations including:

when new data needs to be transmitted over an existing session, performing ACB detection on each of multiple cell groups associated with a PDCP entity;

in response to an ACB detection result indicating that a cell group is barred, shielding transmission of the new data to the cell group.

The operation of performing ACB detection on each of multiple cell groups associated with a PDCP entity includes:

performing ACB detection on each of the multiple cell groups associated with the PDCP entity by an RRC layer; and sending the ACB detection result to a PDCP layer by the RRC layer;

or, sending access control barring parameters required for ACB detection to the PDCP layer by the RRC layer; and perform, according to the access control barring parameters, ACB detection on each of the multiple cell groups associated with the PDCP entity by the PDCP layer.

The instructions, when being executed, further cause the device to perform the operation of:

receiving dedicated signaling from a network side, where the dedicated signaling includes access control barring parameters.

The operation of performing ACB detection on each of multiple cell groups associated with a PDCP entity includes:

performing ACB detection on each of the multiple cell groups associated with the PDCP entity according to the access control barring parameters.

The access control barring parameters include logical channel parameters or DRB barring parameters corresponding to each cell group.

The operation of performing ACB detection on each of multiple cell groups associated with a PDCP entity includes:

performing, according to the logical channel parameters corresponding to each cell group, ACB detection on logical channels corresponding to the cell group; or performing, according to the DRB barring parameters corresponding to each cell group, ACB detection on DRBs corresponding to the cell group.

The multiple cell groups include an MCG and an SCG.

The operation of when the new data needs to be transmitted over the existing session, performing ACB detection on each of the multiple cell groups associated with the PDCP entity includes:

performing ACB detection on the MCG when the new data needs to be transmitted on the existing session through a split bear; and applying an ACB detection result of the MCG to the SCG.

The access control barring parameters do not include the access control barring parameters corresponding to the SCG.

The operation of shielding the transmission of the new data to the cell group includes:

canceling, by the PDCP layer, transmission of the new data to the cell group that is barred as indicated by the ACB detection result.

The operation of shielding the transmission of the new data to the cell group includes:

notifying, by the PDCP layer, that an amount of uplink data to be transmitted is zero to an MAC layer corresponding to the cell group that is barred as indicated by the ACB detection result.

The instructions, when being executed, further cause the device to perform the operations of:

starting an ACB timer corresponding to the cell group that is barred as indicated by the ACB detection result; and performing, when the ACB timer has expired, ACB detection again on the cell group that is barred as indicated by the ACB detection result.

The instructions, when being executed, further cause the device to perform the operations of:

in response to the ACB detection result indicating that a cell group is not barred, transmit, on the cell group that the cell group is not barred as indicated by the ACB detection result, the new data corresponding to the cell group that is barred as indicated by the ACB detection result.

The instructions, when being executed, further cause the device to perform the operations of:

in response to the ACB detection result indicating that a cell group is not barred, transmitting the new data on the cell group;

starting an activity timer; and shielding the ACB detection before the activity timer has expired and when the new data needs to be transmitted again over the existing session.

After considering the specification and practicing the disclosure disclosed herein, those skilled in the art will easily think of other embodiments of the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only to be regarded as exemplary, and the true scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A method for controlling data transmission, comprising:
   when new data needs to be transmitted over an existing session, performing Access Class Barring (ACB) detection on each of multiple cell groups associated with a Packet Data Convergence Protocol (PDCP) entity; and
   in response to an ACB detection result indicating that a cell group is barred, shielding transmission of the new data to the cell group.

2. The method of claim 1, wherein the performing ACB detection on each of the multiple cell groups associated with the PDCP entity comprises:
   performing ACB detection on each of the multiple cell groups associated with the PDCP entity by a Radio Resource Control (RRC) layer; and
   sending the ACB detection result to a PDCP layer by the RRC layer;
   or,
   sending access control barring parameters required for ACB detection to the PDCP layer by the RRC layer; and
   performing, by the PDCP layer according to the access control barring parameters, ACB detection on each of the multiple cell groups associated with the PDCP entity.

3. The method of claim 1, further comprising:
   receiving dedicated signaling from a network side, wherein the dedicated signaling comprises access control barring parameters,
   wherein the performing ACB detection on each of the multiple cell groups associated with the PDCP entity comprises:
   performing ACB detection on each of the multiple cell groups associated with the PDCP entity according to the access control barring parameters.

4. The method of claim 3, wherein the access control barring parameters comprise logical channel parameters or Data Radio Bearer (DRB) barring parameters corresponding to each cell group, and
   performing ACB detection on each of the multiple cell groups associated with the PDCP entity comprises:
   performing, according to the logical channel parameters corresponding to each cell group, ACB detection on logical channels corresponding to the cell group; or
   performing, according to the DRB barring parameters corresponding to each cell group, ACB detection on DRBs corresponding to the cell group.

5. The method of claim 3, wherein the multiple cell groups comprise a Master Cell Group (MCG) and a Secondary Cell Group (SCG); and
   wherein when the new data needs to be transmitted over the existing session, the performing ACB detection on each of the multiple cell groups associated with the PDCP entity comprises:
   performing ACB detection on the MCG through a split bearer when the new data needs to be transmitted on the existing session; and
   applying an ACB detection result of the MCG to the SCG.

6. The method of claim 5, wherein the access control barring parameters do not comprise access control barring parameters corresponding to the SCG.

7. The method of claim 1, wherein the shielding the transmission of the new data to the cell group comprises:
   canceling, by the PDCP layer, transmission of the new data to the cell group that is barred as indicated by the ACB detection result.

8. The method of claim 7, wherein the shielding the transmission of the new data to the cell group comprises:
   notifying, by the PDCP layer, that an amount of uplink data to be transmitted is zero to a Media Access Control (MAC) layer corresponding to the cell group that is barred as indicated by the ACB detection result.

9. The method of claim 1, further comprising:
   starting an ACB timer corresponding to the cell group that is barred as indicated by the ACB detection result; and
   performing, when the ACB timer has expired, ACB detection again on the cell group that is barred as indicated by the ACB detection result.

10. The method of claim 1, further comprising:
    in response to the ACB detection result indicating that a cell group is not barred, transmitting, on the cell group that is not barred as indicated by the ACB detection result, the new data corresponding to the cell group that is barred as indicated by the ACB detection result.

11. The method of claim 1, further comprising:
    in response to the ACB detection result indicating that a cell group is not barred, transmitting the new data on the cell group;
    starting an activity timer; and
    shielding the ACB detection before the activity timer has expired and when the new data needs to be transmitted again over the existing session.

12. A device for controlling data transmission, comprising:
    a processor; and
    memory storing instructions executable by the processor;
    wherein the processor is configured to:
    when new data needs to be transmitted over an existing session, perform Access Class Barring (ACB) detection on each of multiple cell groups associated with a Packet Data Convergence Protocol (PDCP) entity;
    in response to an ACB detection result indicating that a cell group is barred, shield transmission of the new data to the cell group.

13. The device of claim 12, wherein the processor is configured to perform ACB detection on each of the multiple cell groups associated with the PDCP entity by:
    performing ACB detection on each of the multiple cell groups associated with the PDCP entity by an RRC layer; and
    sending the ACB detection result to a PDCP layer by the RRC layer;
    or,
    sending access control barring parameters required for ACB detection to the PDCP layer by the RRC layer; and
    performing, by the PDCP layer according to the access control barring parameters, ACB detection on each of the multiple cell groups associated with the PDCP entity.

14. The device of claim 12, wherein the processor is further configured to:
    receive dedicated signaling from a network side, wherein the dedicated signaling comprises access control barring parameters, and
    perform ACB detection on each of the multiple cell groups associated with the PDCP entity by:
    performing ACB detection on each of the multiple cell groups associated with the PDCP entity according to the access control barring parameters.

15. The device of claim 14, wherein the access control barring parameters comprise logical channel parameters or Data Radio Bearer (DRB) barring parameters corresponding to each cell group, and the processor is configured to perform ACB detection on each of the multiple cell groups associated with the PDCP entity by:

performing, according to the logical channel parameters corresponding to each cell group, ACB detection on logical channels corresponding to the cell group; or performing, according to the DRB barring parameters corresponding to each cell group, ACB detection on DRBs corresponding to the cell group.

16. The device of claim 14, wherein the multiple cell groups comprise a Master Cell Group (MCG) and a Secondary Cell Group (SCG), and the processor is configured to perform ACB detection on each of the multiple cell groups associated with the PDCP entity when the new data needs to be transmitted over the existing session by:

performing ACB detection on the MCG through a split bearer when the new data needs to be transmitted on the existing session; and applying an ACB detection result of the MCG to the SCG.

17. The device of claim 16, wherein the access control barring parameters do not comprise access control barring parameters corresponding to the SCG.

18. The device of claim 12, wherein the processor is configured to shield the transmission of the new data to the cell group by:

canceling, by the PDCP layer, transmission of the new data to the cell group that is barred as indicated by the ACB detection result; and notifying, by the PDCP layer, that an amount of uplink data to be transmitted is zero to a Media Access Control (MAC) layer corresponding to the cell group that is barred as indicated by the ACB detection result.

19. The device of claim 18, wherein the processor is further configured to:

perform ACB detection of multiple granularities including at least one of logical channel category and data radio bearer category in multiple user planes; and reduce resource consumption by frequent detection by using an ACB timer.

20. A non-transitory computer-readable storage medium, having stored computer instructions thereon, wherein the computer instructions, when being executed by a processor, cause the processor to implement operations including:

when new data needs to be transmitted over an existing session, performing Access Class Barring (ACB) detection on each of multiple cell groups associated with a Packet Data Convergence Protocol (PDCP) entity; and in response to an ACB detection result indicating that a cell group is barred, shielding transmission of the new data to the cell group.

* * * * *